US 9,134,865 B2

(12) United States Patent
Watanabe

(10) Patent No.: US 9,134,865 B2
(45) Date of Patent: Sep. 15, 2015

(54) TOUCH INPUT SYSTEM, TOUCH INPUT APPARATUS, STORAGE MEDIUM AND TOUCH INPUT CONTROL METHOD, FOR DISPLAYING A LOCUS OF A LINE ON A DISPLAY BY PERFORMING AN INPUT OPERATION ON AN INPUT TERMINAL DEVICE

(71) Applicant: NINTENDO CO., LTD., Kyoto (JP)

(72) Inventor: Tatsumitsu Watanabe, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 149 days.

(21) Appl. No.: 13/901,138

(22) Filed: May 23, 2013

(65) Prior Publication Data
US 2014/0085255 A1    Mar. 27, 2014

(51) Int. Cl.
G06F 3/044 (2006.01)
G06F 3/0488 (2013.01)
A63F 13/20 (2014.01)
A63F 13/30 (2014.01)
A63F 13/40 (2014.01)

(52) U.S. Cl.
CPC .............. *G06F 3/044* (2013.01); *A63F 13/06* (2013.01); *A63F 13/10* (2013.01); *A63F 13/12* (2013.01); *A63F 2300/1068* (2013.01); *G06F 3/04883* (2013.01)

(58) Field of Classification Search
CPC ...... G06F 3/044; G06F 3/04883; A63F 13/06; A63F 13/10; A63F 13/12; A63F 2300/1068
See application file for complete search history.

(56) References Cited

U.S. PATENT DOCUMENTS

| 2008/0185193 | A1* | 8/2008 | Lin ............................ 178/18.06 |
| 2010/0271300 | A1* | 10/2010 | Hsu et al. |
| 2010/0302199 | A1* | 12/2010 | Taylor et al. .................. 345/174 |
| 2013/0007653 | A1* | 1/2013 | Stolyarov et al. ............. 715/784 |

FOREIGN PATENT DOCUMENTS

JP                4740608            5/2011

* cited by examiner

Primary Examiner — Larry Sternbane
(74) Attorney, Agent, or Firm — Nixon & Vanderhye P.C.

(57) ABSTRACT

A non-limiting example game system includes a game apparatus which is connected with a television. Furthermore, there is provided with an input terminal device which functions as an input device for the game apparatus. A game screen is displayed on a screen of the television, and a player draws a locus in accordance with a predetermined course from a start to a goal included in the game screen by performing an input operation using the input terminal device. At this time, an inputting surface of a touch panel provided on the input terminal device is turned toward the television. Accordingly, the locus by a slide operation is depicted on the game screen as if the locus is reflected in a mirror.

10 Claims, 12 Drawing Sheets (A) LOCUS OF INPUT OPERATION (SLIDE OPERATION)

(B) OPERATION LOCUS ON TELEVISION SCREEN

FIG. 4
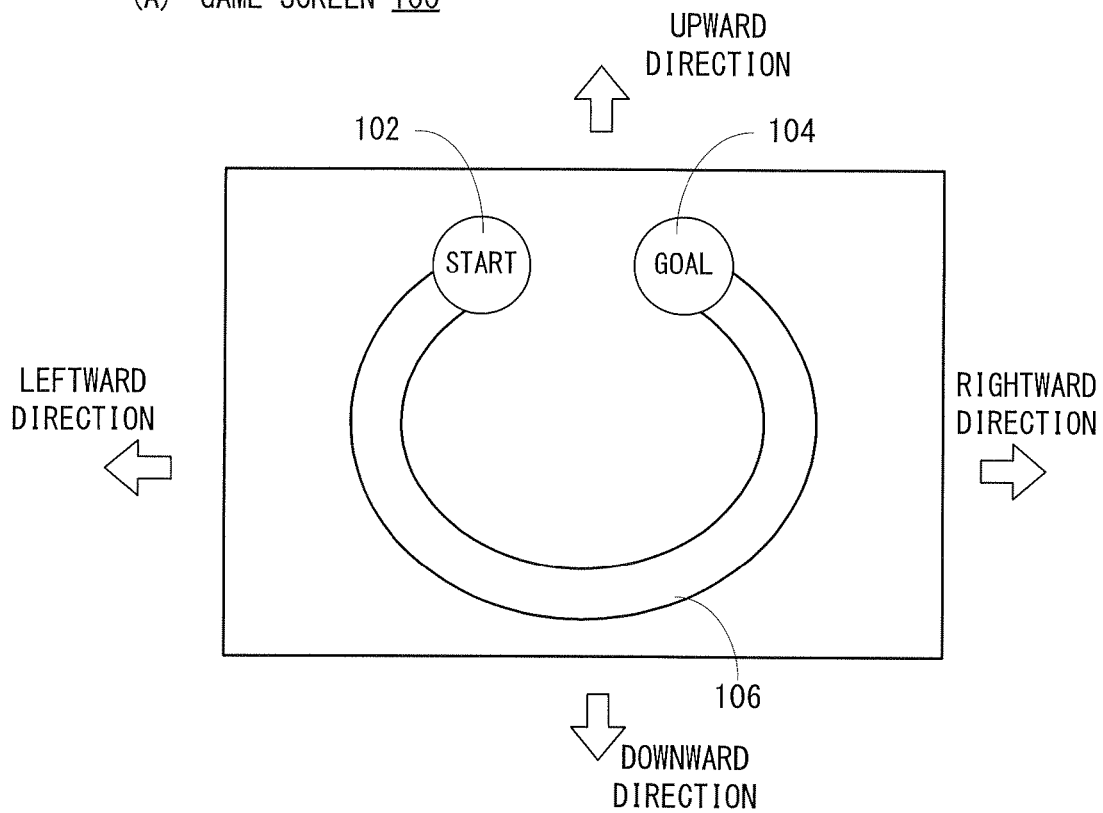
(A) GAME SCREEN 100
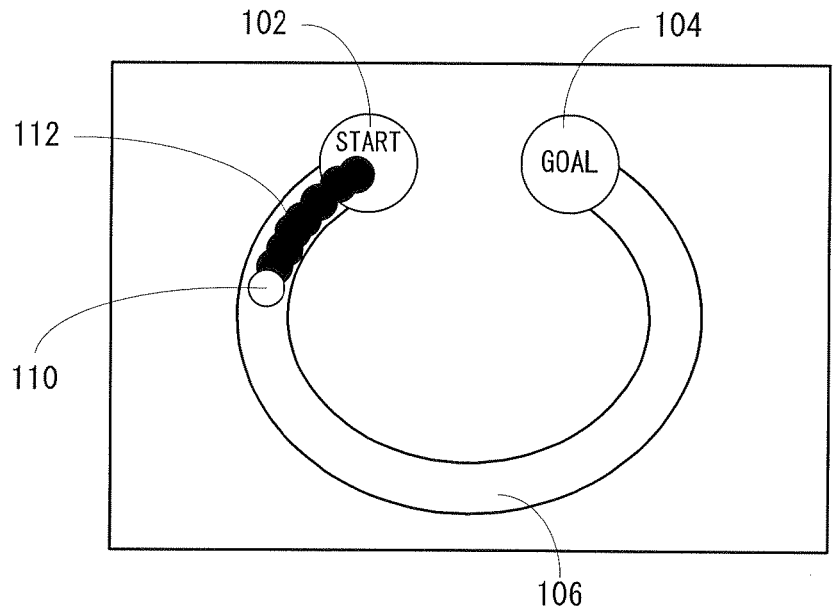
(B) GAME SCREEN 100

FIG. 7
(A) COORDINATES SYSTEM SET TO INPUTTING SURFACE OF INPUT TERMINAL DEVICE
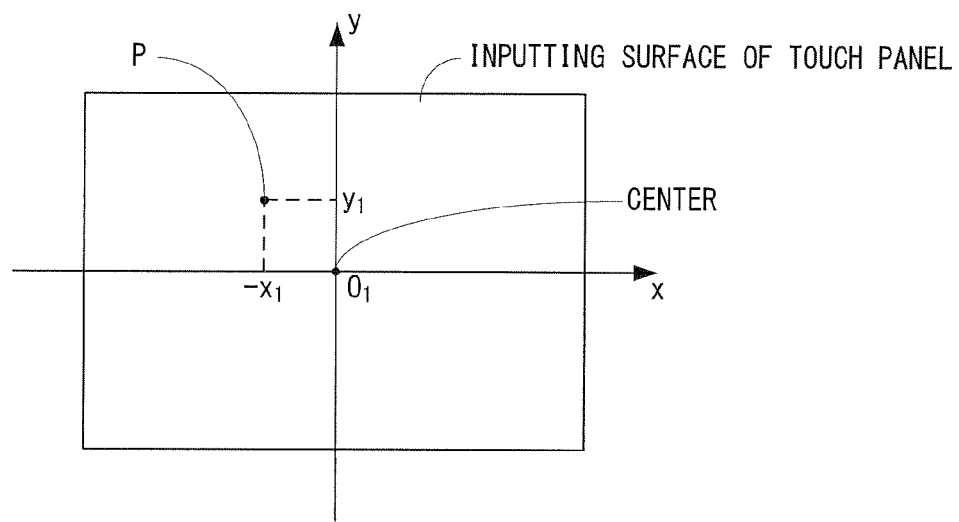
(B) COORDINATES SYSTEM SET TO TELEVISION GAME IMAGE PRODUCED IN VRAM
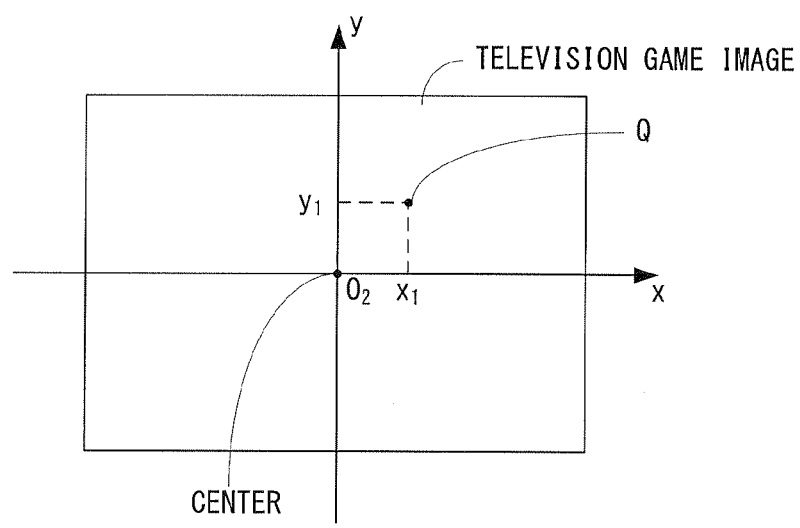

FIG. 9
(A) LOCUS OF INPUT OPERATION (SLIDE OPERATION)
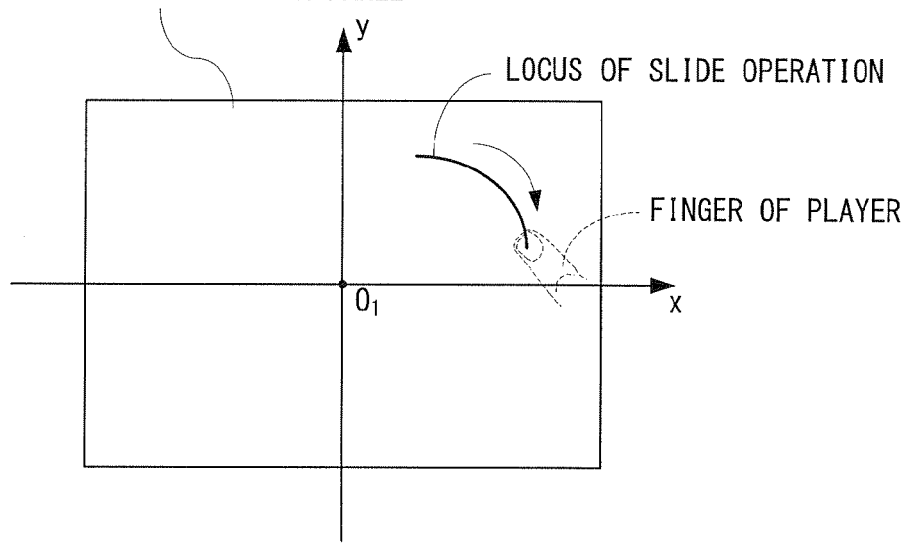
(B) OPERATION LOCUS ON TELEVISION SCREEN
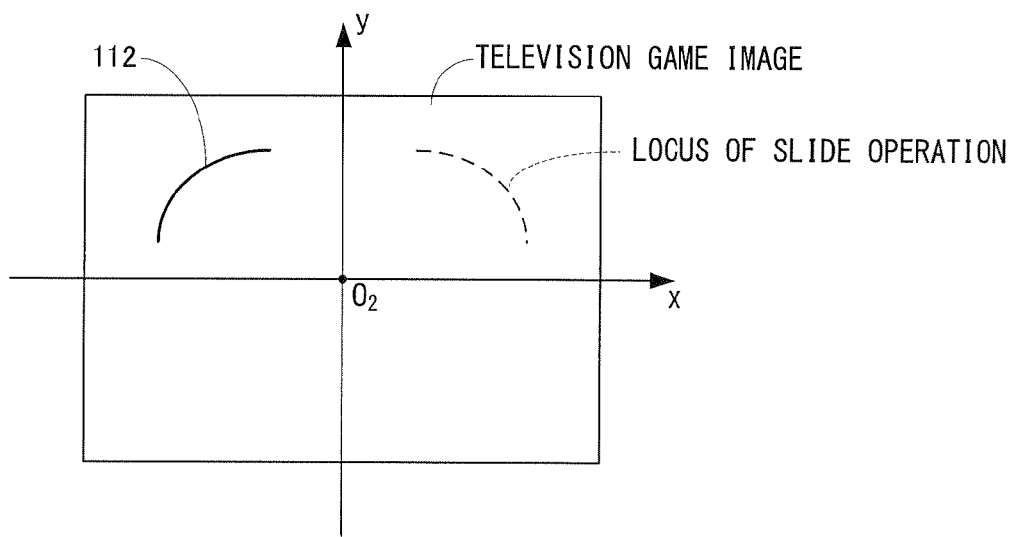

TOUCH INPUT SYSTEM, TOUCH INPUT APPARATUS, STORAGE MEDIUM AND TOUCH INPUT CONTROL METHOD, FOR DISPLAYING A LOCUS OF A LINE ON A DISPLAY BY PERFORMING AN INPUT OPERATION ON AN INPUT TERMINAL DEVICE

CROSS REFERENCE OF RELATED APPLICATION

The disclosure of Japanese Patent Application No. 2012-211346 filed on Sep. 25, 2012 is incorporated herein by reference.

FIELD

This application describes a touch input system, touch input apparatus, storage medium and touch input control method, performing information processing based on a touch input.

SUMMARY

It is a primary object of the present embodiment to provide a novel touch input system, touch input apparatus, storage medium and touch input control method.

Furthermore, another object of the present embodiment is to provide a touch input system, touch input apparatus, storage medium and touch input control method, capable of performing an innovative input operation.

A first embodiment is a touch input system which comprises a touch input portion; a first display portion which is not brought into contact with the touch input portion; and an information processing portion configured to perform information processing based on a touch input onto the touch input portion to produce an image which is displayed on the first display portion. The information processing portion performs the information processing based on an input position by the touch input to produce an indicator image which is an image which becomes an indicator for the input position and has a positional relationship rendered in line symmetry or point symmetry with respect to the input position.

According to the first embodiment, since the indicator image which has the positional relationship that is rendered in line symmetry or point symmetry with respect to the input position of the touch input is displayed, it is possible to perform an innovative input operation which is different from a conventional input operation.

A second embodiment is according to the first embodiment, wherein the information processing portion produces the indicator image having a positional relationship that is reversed with respect to the input position in a horizontal direction. Therefore, if a touch input is performed while an inputting surface of the touch input portion is turned toward the first display portion, for example, the indicator image is displayed at a corresponding position on a displaying surface of the first display portion as if the input position of the touch input is reflected in a mirror.

According to the second embodiment, it is possible to perform an innovative input operation that the touch input is performed while the inputting surface of the touch input portion is turned toward the first display portion.

A third embodiment is according to the first embodiment, wherein the indicator image includes an image indicative of a position corresponding to the input position.

According to the third embodiment, it is possible to know, by the indicator image, a position on the displaying surface corresponding to a current input position.

A fourth embodiment is according to the first embodiment, wherein the indicator image includes an image indicative of a position corresponding to a position to be touched.

According to the fourth embodiment, it is possible to know, by the indicator image, a position corresponding to a position which is to be touched.

A fifth embodiment is according to the first embodiment, further comprising a second display portion that the touch input portion is provided on its displaying surface.

According to the fifth embodiment, since the second display portion is provided, it is possible to provide information that is visible at a side of the touch input portion.

A sixth embodiment is according to the fifth embodiment, wherein the information processing portion further produces an image which is displayed on the second display portion. For example, the information processing portion produces an image for providing information related to a touch input (input operation) method.

According to the sixth embodiment, it is possible to provide the information related to information processing such as a touch input method visibly.

A seventh embodiment is according to the first embodiment, wherein the information processing portion performs game processing based on the touch input.

According to the seventh embodiment, it is possible to enjoy a game through an innovative input operation.

An eighth embodiment is a touch input apparatus which displays an image on a display portion which is not brought into contact with a touch input portion, comprising: an information processing portion configured to perform information processing based on an input by a touch input portion to produce an indicator image which is an image which becomes an indicator for the input position at a position having a positional relationship rendered in line symmetry or point symmetry with respect to the input position.

A ninth embodiment is a non-transitory computer readable storage medium storing a touch input control program executable by a computer which displays an image on a display portion which is not brought into contact with a touch input portion, wherein the touch input control program causes the computer to function as an information processing portion configured to perform information processing based on an input position by the touch input portion to produce an indicator image which is an image which becomes an indicator for the input position at a position having a positional relationship rendered in line symmetry or point symmetry with respect to the input position.

A tenth embodiment is a touch input control method by a computer system provided with a touch input portion and a display portion which is not brought into contact with a touch input portion, comprising steps of: (a) detecting an input position by the touch input onto the touch input portion; and (b) performing information processing based on an input position detected in the step (a) to produce an indicator image which is an image which becomes an indicator for the input position at a position having a positional relationship rendered line symmetry or point symmetry with respect to the input position and to display the image on the display portion.

In each of the eighth to tenth embodiments, it is also possible to perform an innovative input operation.

The above described objects and other objects, features, aspects and advantages of the embodiments will become more apparent from the following detailed description when taken in conjunction with the accompanying drawings.

BRIEF DESCRIPTION OF THE DRAWINGS

FIG. 4 is a view showing a non-limiting example game screen of a television.

FIG. 7 is a view showing a non-limiting example coordinates system which is set to an inputting surface of a touch panel and a non-limiting example coordinates system which is set to a television game image.

FIG. 9 is a view showing a non-limiting example correspondence relationship between a locus of an input operation and an operation locus.

DETAILED DESCRIPTION OF NON-LIMITING EXAMPLE EMBODIMENTS

Figure 1:
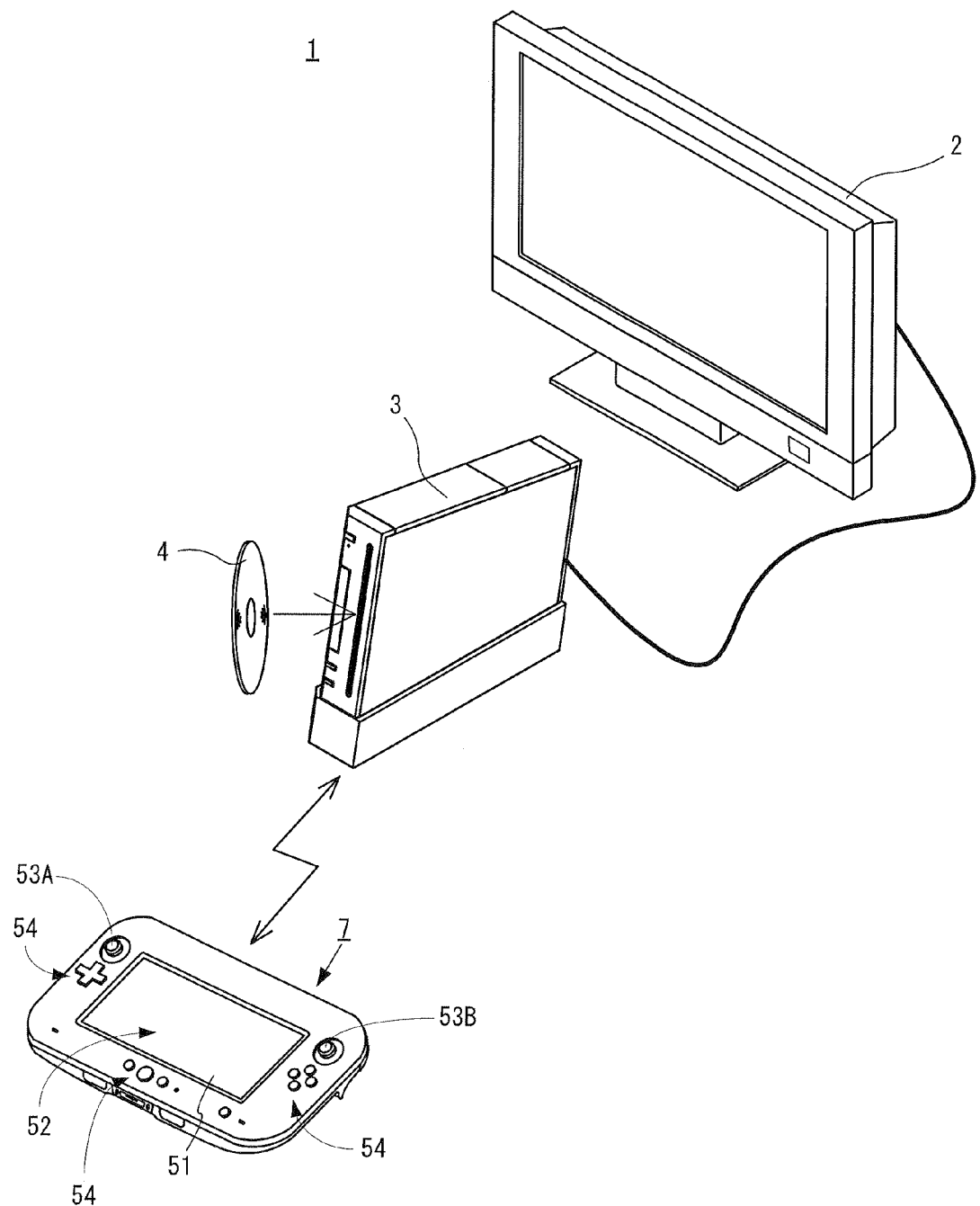
FIG. 1 is an appearance view of a non-limiting example game system.

A non-limiting example game system 1 is described with reference to drawings below. The game system 1 shown in FIG. 1 includes a stationary-type display device (hereinafter, referred to as "television") 2 typified by a television receiver or the like, a console-type game apparatus 3, an optical disk 4 and an input terminal device 7. The game system 1 is for performing game processing in the game apparatus 3 based on game operations by using the input terminal device 7, and displaying a game image obtained by the game processing on the television 2 and/or the input terminal device 7.

Into the game apparatus 3, the optical disk 4 being one example of an information storage medium that is used to be replaceable with respect to the game apparatus 3 is detachably loaded. In the optical disk 4, an information processing program (typically, an application program such as a game program) to be executed in the game apparatus 3 is stored. The game apparatus 3 executes information processing (game processing) by reading and executing the information processing program stored in the optical disk 4 loaded into a loading slot provided on a front surface thereof.

To the game apparatus 3, the television 2 is connected via a connection cord. The television 2 displays a game image obtained through the game processing executed by the game apparatus 3. The television 2 has a speaker 2a (FIG. 2), and the speaker 2a outputs game sounds obtained as a result of the game processing described above.

Here, in another embodiment, the game apparatus 3 and the stationary-type display device may be integrally formed with each other. Furthermore, communications between the game apparatus 3 and the television 2 may be performed wirelessly.

The input terminal device 7 sends and receives data with at least the game apparatus 3. The user (player) can use the input terminal device 7 by moving it with his or her hands, and by placing the input terminal device 7 at an arbitrary position. Although a detailed description will be made later, the input terminal device 7 has a displaying means such as an LCD 51 and an inputting means such as a touch panel 52, analog sticks 53A and 53B and an operating button 54. The input terminal device 7 can communicate with the game apparatus 3 through a wireless communication using a technique of Bluetooth (registered trademark), for example. However, the input terminal device 7 and the game apparatus 3 may be connected to each other by a cable or wire. The input terminal device 7 receives from the game apparatus 3 data of an image (game image, for example) produced in the game apparatus 3, and displays the image on the LCD 51. Furthermore, the input terminal device 7 sends to the game apparatus 3 operation data indicating a content of the operation performed on the user's own device.

It should be noted that in this embodiment, an LCD is employed as a display device, but the input terminal device 7 may include another arbitrary display device such as a display using EL (Electro Luminescence), for example.

Additionally, in FIG. 1, the number of input terminal devices 7 included in the game system 1 is one, but the game apparatus 3 can communicate with a plurality of input terminal devices 7, and it is possible for a plurality of persons to play a game by simultaneously using a predetermined number of input terminal devices 7.

Figure 2:
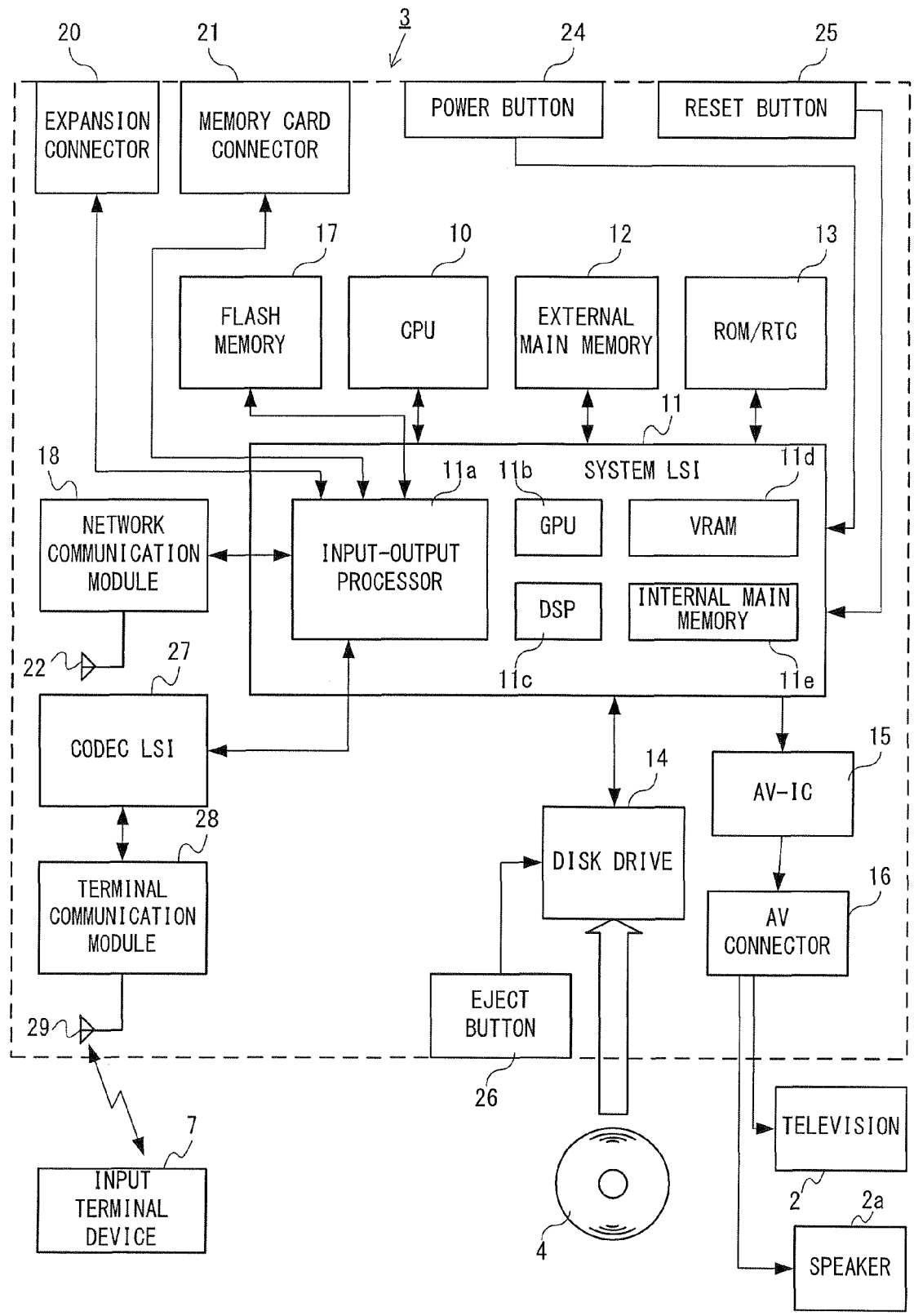
FIG. 2 is a block diagram showing a non-limiting example electric configuration of a game apparatus.

FIG. 2 is a block diagram showing a non-limiting example electric configuration of a game apparatus 3. The game apparatus 3 has a CPU 10, a system LSI 11, an external main memory 12, a ROM/RTC 13, a disk drive 14, an AV-IC 15, etc.

The CPU 10 is for executing game processing by executing the game program stored in the optical disk 4, and functions as a game processor. The CPU 10 is connected to the system LSI 11. The system LSI 11 is connected with the external main memory 12, the ROM/RTC 13, the disk drive 14 and the AV-IC 15 in addition to the CPU 10. The system LSI 11 performs processing of controlling data transfer between the respective components connected thereto, producing images to be displayed, acquiring data from external devices, and so on.

The external main memory 12 being volatile is for storing programs such as a game program read from the optical disk 4, a game program, etc. read from the flash memory 17, storing various data, and is utilized as a working area and a buffer area for the CPU 10. The ROM/RTC 13 has a ROM (so called a boot ROM) including a program for activating the game apparatus 3 and a clock circuit (RTC) for counting a time. The disk drive 14 reads program data, texture data, etc. from the optical disk 4, and writes the read data to an internal main memory 11e described later or the external main memory 12.

The system LSI 11 is provided with an input-output processor (I/O processor) 11a, a GPU 11b, a DSP 11c, a VRAM 11d, and the internal main memory 11e. Although illustration is omitted, these components 11a-11e are connected with each other by internal buses.

The GPU 11b configures a part of a depicting or drawing means, and produces image data according to a graphics command from the CPU 10. Here, data such as polygon data, texture data, etc. is stored in the VRAM 11d, and the GPU 11b generates the image data by using such the data. In this embodiment, the game apparatus 3 generates both of a game image to be displayed on the television 2 and a game image to be displayed on the input terminal device 7. Hereinafter, the game image displayed on the television 2 may be called as "television game image", and the game image displayed on the input terminal device 7 may be called as "terminal game image".

The DSP 11c functions as an audio processor, and generates sound data by using sound data and sound waveform (tone) data stored in the internal main memory 11e and the external main memory 12. In this embodiment, with respect to the game sound, as similar to the game image, both of a game sound to be output from the speaker of the television 2 and a game sound to be output from the speaker of the input terminal device 7 are produced. Hereinafter, the game sound output from the television 2 may be called as "television game sound", and the game sound output from the input terminal device 7 may be called as "terminal game sound".

As described above, data of images and sounds (including sound effects, game music, etc. This holds true below.) to be output to the television 2 out of the images and sounds produced in the game apparatus 3 are read by the AV-IC 15. The AV-IC 15 outputs the read image data to the television 2 via the AV connector 16, and outputs the read sound data to the speaker 2a integrated in the television 2. Thus, an image is displayed on the television 2 while a sound is output from the speaker 2a.

Also, data of images and sounds to be output by the input terminal device 7 out of the images and sounds produced in the game apparatus 3 are sent to the input terminal device 7 by the input-output processor 11a, etc. The data transmission to the input terminal device 7 by the input-output processor 11a, etc. is described later.

The input-output processor 11a executes data transmission and reception with the components connected thereto, and executes downloading data from external devices. Also, the input-output processor 11a is connected to the flash memory 17, a network communication module 18, an expansion connector 20, a memory card connector 21, and a codec LSI 27. Furthermore, the network communication module 18 is connected with an antenna 22. The controller communication module 19 is connected with an antenna 23. The codec LSI 27 is connected to a terminal communication module 28, and the terminal communication module 28 is connected with an antenna 29.

The input-output processor 11a can be connected to networks like the Internet, etc. via the network communication module 18 and the antenna 22, and communicate with external information processing apparatuses (other game apparatuses, various servers and so on, for example) being connected to the network.

The input-output processor 11a periodically accesses the flash memory 17 to detect the presence or absence of data required to be sent to the network, and if the data is present, sends the data to the network via the network communication module 18 and the antenna 22.

Also, the input-output processor 11a receives data sent from external information processing apparatuses and data downloaded from a download server via the network, the antenna 22 and the network communication module 18, and stores the received data in the flash memory 17.

The CPU 10 executes the game program to thereby read the data stored in the flash memory 17 so as to use the data in the game program. In the flash memory 17, in addition to the data to be sent and received between the game apparatus 3 and the external information processing apparatuses, save data (result data or proceeding data of the game) of the game played by using the game apparatus 3 may be stored. Also, in the flash memory 17, the game program may be stored.

Also, the game apparatus 3 can send and receive data of images or videos, sounds audio, etc. to and from the input terminal device 7. The input-output processor 11a outputs the data of the game image produced by the GPU 11b to the codec LSI 27 if sending the game image (terminal game image) to the input terminal device 7. The codec LSI 27 performs predetermined compression processing on the image data from the input-output processor 11a. The terminal communication module 28 communicates with the input terminal device 7 wirelessly. Accordingly, the image data compressed by the codec LSI 27 is sent to the input terminal device 7 via the antenna 29 by the terminal communication module 28. In this embodiment, the codec LSI 27 compresses the image data by using efficient compression technique, such as H.264 standard, for example.

It should be noted that a compression technique except for it may be used, and the image data may be adapted to be sent without being compressed if the communication speed is high enough.

Furthermore, the terminal communication module 28 is a communication module for which the Wi-Fi certification is obtained, for example, and may use a MIMO (Multiple Input Multiple Output) technique employed in IEEE802.11n standard, for example, to thereby make high speed wireless communications with the input terminal device 7, or may use other communication systems.

In addition, the game apparatus 3 sends sound data to the input terminal device 7 besides the image data. That is, the input-output processor 11a outputs the sound data produced by the DSP 11c to the terminal communication module 28 via the codec LSI 27. The codec LSI 27 also performs the compression processing on the sound data, similar to the image data. The compression format of the sound data may be of any format. In another embodiment, the sound data may be sent without being compressed. The terminal communication module 28 sends the compressed image data and sound data to the input terminal device 7 via the antenna 29.

Additionally, the game apparatus 3 can receive various data from the input terminal device 7. Although the detail is described later, in this embodiment, the input terminal device 7 sends operation data, image data, and sound data. Each data sent from the input terminal device 7 is received by the terminal communication module 28 via the antenna 29. Here, the image data and the sound data from the input terminal device 7 undergoes compression processing similar to the image data and the sound data from the game apparatus 3 to the input terminal device 7.

Accordingly, the image data and the sound data are sent from the terminal communication module 28 to the codec LSI 27, then undergo expansion processing by the codec LSI 27, and output to the input-output processor 11a.

Figure 3:
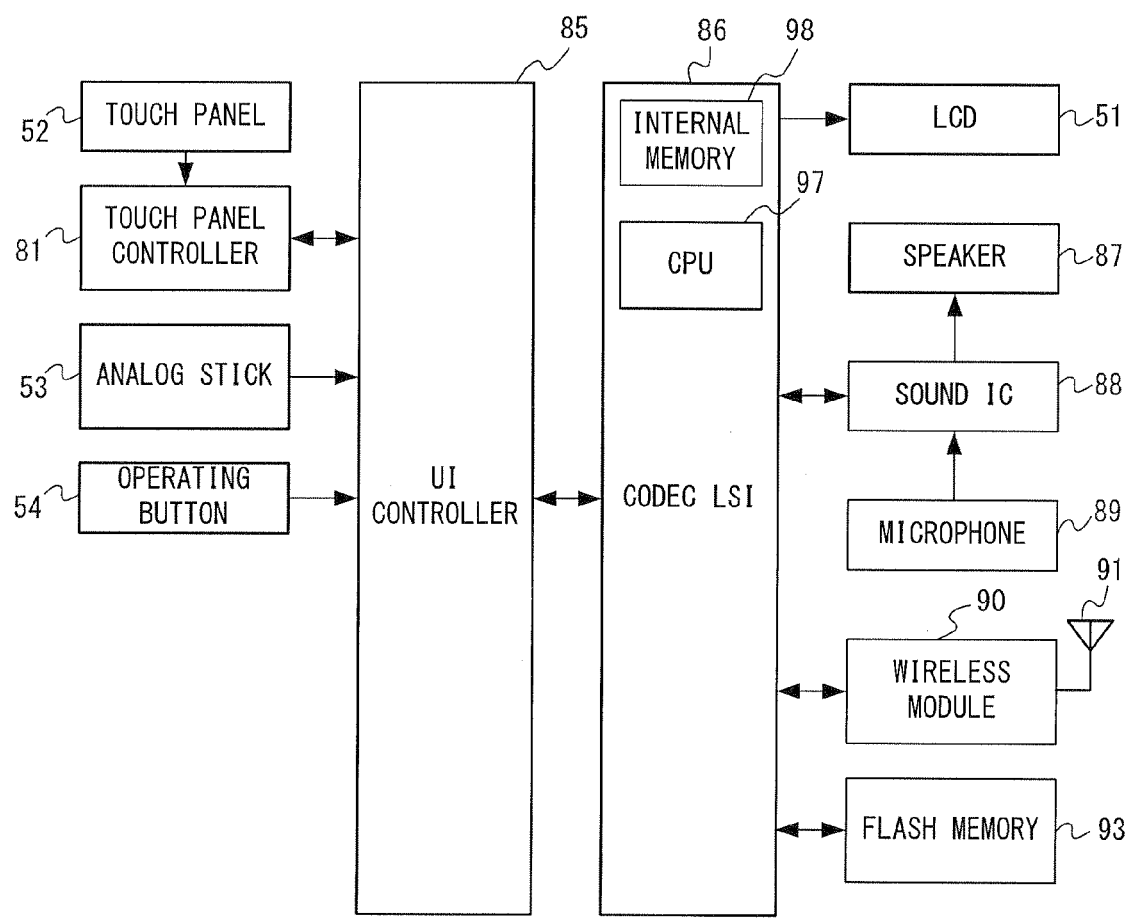
FIG. 3 is a block diagram showing a non-limiting example electric configuration of an input terminal device.

In addition, the image data from the input terminal device 7 includes image data corresponding to an image imaged by a camera not shown and so on, the sound data from the input terminal device 7 includes sound data corresponding to sounds (voice, hand clapping, etc.) that is generated by the player and detected by a microphone 89 (see FIG. 3).

On the other hand, the operation data from the input terminal device 7, which has less data than images and sounds, may not be required to undergo the compression processing. Also, it may be encoded as required or may not be encoded. Accordingly, the operation data is received in the terminal communication module 28, and then output to the input-output processor 11a via the codec LSI 27. The input-output processor 11a stores (temporarily stores) the data received from the input terminal device 7 in the buffer area of the internal main memory 11e or the external main memory 12.

Furthermore, the game apparatus 3 can connect to another appliance and an external storage. That is, the input-output processor 11a is connected with the expansion connector 20 and the memory card connector 21. The expansion connector 20 is a connector for interfaces such as USB, SCSI. The expansion connector 20 can be connected with a medium such as an external storage medium and connected with peripheral devices of other controllers, etc., and can make communication with networks in place of the network communication module 18 by being connected with a wired connector for communication.

The memory card connector 21 is a connector for being connected with an external storage such as a memory card. For example, the input-output processor 11a can access the external storage via the expansion connector 20 and the memory card connector 21, and can store data in the external storage and read data from the external storage.

The game apparatus 3 is provided with a power button 24, a reset button 25, and an eject button 26. The power button 24 and the reset button 25 are connected to the system LSI 11. When the power button 24 is turned on, electric power is supplied to the respective components of the game apparatus 3 from an external power source by an AC adapter not shown. When the reset button 25 is pushed, the system LSI 11 restarts an activation program of the game apparatus 3. The eject button 26 is connected to the disk drive 14. When the eject button 26 is pushed, the optical disk 4 is ejected from the disk drive 14.

It should be noted that in another embodiment, some components contained in the game apparatus 3 may be configured as an expansion unit provided separately from the game apparatus 3. At this time, the expansion unit may be connected to the game apparatus 3 via the aforementioned expansion connector 20, for example.

FIG. 3 is a block diagram showing a non-limiting example electric configuration of the input terminal device 7. As shown in FIG. 3, the input terminal device 7 has a touch panel controller 81, a user interface controller (UI controller) 85, a codec LSI 86, a speaker 87, a sound IC 88, a microphone 89, a wireless module 90, an antenna 91 and a flash memory 93 besides the components shown in FIG. 1. These electronic components are mounted on an electronic circuit board and contained in the housing.

Although illustration is omitted, the input terminal device 7 is supplied with power from an integrated battery or an external power source.

The UI controller 85 is a circuit for controlling an input and an output of data to and from various input-output portions. The UI controller 85 is connected with the touch panel controller 81, the analog stick 53 (analog sticks 53A and 53B), and the operation button 54. Also, the UI controller 85 is connected to the codec LSI 86.

The touch panel controller 81 is connected to the touch panel 52, and is a circuit for performing a control on the touch panel 52. The touch panel controller 81 generates touch position data in a predetermined format on the basis of a signal from the touch panel 52 and outputs it to the UI controller 85. The touch position data represents coordinates of the position (touch position) where a touch input (input operation) is made on an inputting surface of the touch panel 52. In this embodiment, the input operation is performed with a so-called singular touch, representing a "touch-on operation" or "slide operation". The "touch-on operation" represents an operation such that a state of a player's finger being not touched is changed to a state of the finger being touched (touched-on state). However, it can just be said as being "touch". Furthermore, the "slide operation" represents an operation for changing a position being touched in a state that the inputting surface keeps touched.

Here, the touch panel controller 81 performs reading signals from the touch panel 52 and generation of touch position data at each predetermined time. Furthermore, from the UI controller 85 to the touch panel controller 81, various control instructions with respect to the touch panel 52 are output.

The analog stick 53 outputs stick data representing a direction in which the stick portion to be operated by the fingers of the user is slid (or tilted) and an amount of the sliding to the UI controller 85. Furthermore, the operation button 54 outputs operation button data representing an input status (whether to be pushed or not) with respect to each operation button (a cross button and various push buttons) to the UI controller 85.

The UI controller 85 outputs operation button data including the touch position data, the stick data, and the operation button data from the respective components described above to the codec LSI 86.

The codec LSI 86 is a circuit for performing compression processing on data to be sent to the game apparatus 3 and expansion processing on the data sent from the game apparatus 3. The codec LSI 86 is connected with the LCD 51, the sound IC 88, the wireless module 90, and the flash memory 93. Also, the codec LSI 86 includes a CPU 97 and an internal memory 98.

The input terminal device 7 is adapted so as not to perform the game processing itself, but needs to execute a minimum program for management and communication of the input terminal device 7. When the power is turned on, the CPU 97 reads the program stored in the flash memory 93 into the internal memory 98 and executes it to thereby activate the input terminal device 7. Here, the input terminal device 7 is activated and suspended on the basis of operation data from the game apparatus 3. It should be noted that in this embodiment, the suspension of the input terminal device 7 means a sleep state in which power is supplied to a part of the circuit components (UI controller 85, codec LSI 86 and wireless module 90). In addition, a partial area of the internal memory 98 is used as a VRAM for the LCD 51.

The sound IC 88 is connected to the speaker 87 and the microphone 89, and is a circuit for controlling an input and output of sound data to and from the speaker 87 and the microphone 89. That is, in a case that sound data is received from the codec LSI 86, the sound IC 88 outputs a sound signal obtained by performing D/A conversion on the sound data to the speaker 87, to thereby make the speaker 87 output a sound. Also, the microphone 89 detects sound (voices and cracks (hand clapping), etc. of the user (player)) propagated to the input terminal device 7, and outputs a sound signal indicating the sound to the sound IC 88. The sound IC 88 performs A/D conversion on the sound signal from the microphone 89, and outputs the sound data in the predetermined format to the codec LSI 86.

The codec LSI 86 sends to the game apparatus 3 the image data from the camera, the sound data from the microphone 89, and the operation data from the UI controller 85 via the wireless module 90. In this embodiment, the codec LSI 86 performs compression processing on the image data and the sound data similar to the codec LSI 27. The operation data described above and the compressed image data and sound data are output to the wireless module 90 as sending data.

The wireless module 90 is connected with the antenna 91, and the wireless module 90 sends the aforementioned sending data to the game apparatus 3 via the antenna 91. The wireless module 90 has a function similar to the terminal communication module 28 of the game apparatus 3. That is, the wireless module 90 has a function of connecting to the wireless LAN following the system based on the IEEE 802.11n standard, for example. The data to be sent may be encoded as required or may not be encoded.

As described above, the input terminal device 7 comprises an operating means such as the touch panel 52, the analog stick 53, and the operation button 54, but may be adapted to have other operating means in place of these operating means, or with these operating means in another embodiment. For example, as sensors for evaluating a motion (including a position and posture, or changes in the position and the posture) of the input terminal device 7, at least one of a magnetic sensor, an acceleration sensor and a gyro sensor may be provided.

Additionally, the input terminal device 7 is configured to have the camera and the microphone 89, but in another embodiment, it may not have the camera and the microphone 89, or may have either one of them.

An example of an application (virtual game) performed in such a game system 1 will be described. When the virtual game is started, a television game image (here, a game screen 100) as shown in FIG. 4(A), for example, is displayed on a screen of the television 2. In the game screen 100, a start object 102, a goal object 104 and a course object 106 are displayed. Although not shown, a background image is also displayed.

In addition, the course object 106 is only an example, and it is possible to form an arbitrary course such as a zigzag-fashioned course and a spiral-fashioned course.

In a case where the game screen 100 as shown in FIG. 4(A) is being displayed, if a predetermined condition (a depiction start condition) is satisfied, the player can draw a locus. The depiction start condition is that the start object 102 is continued to be designated for a predetermined time period (2-3 seconds, for example), for example. In addition, the depiction start condition may be that an instruction of a depiction start is given from the game apparatus 3 (game program).

If and when the depiction start condition is satisfied, a locus is drawn on the game screen 100 in accordance with an input operation by the player. In this embodiment, the player performs an input operation (slide operation) on an inputting surface of the touch panel 52 of the input terminal device 7 while seeing the game screen 100 displayed on the screen of the television 2 such that a locus can be drawn along (according to) a predetermined course (course object 106) which is extended from a start (start object 102) to a goal (goal object 104) on the game screen 100. Therefore, it is possible to say that each of the start object 102, the goal object 104 and the course object 106 is an image which becomes an indicator of a position or range to be touched.

An example of the game screen 100 at the time the locus is being depicted is shown in FIG. 4(B). In FIG. 4(B), in addition to the above-described objects (102, 104, 106), a designating image 110 and an operation locus 112 are displayed. The designating image 110 is an image by which a position on the game screen 100 corresponding to a current touch position is designated. That is, the designating image 110 becomes an indicator of a position on the game screen 100 corresponding to a current touch position. Furthermore, the operation locus 112 is an image for a locus depicted on the game screen 100 in correspondence to a locus according to the input operation in a case where the player performs the input operation with using the input terminal device 7. That is, the operation locus 112 becomes an indicator of positions on the game screen 100 corresponding to touch positions until now.

Figure 5:
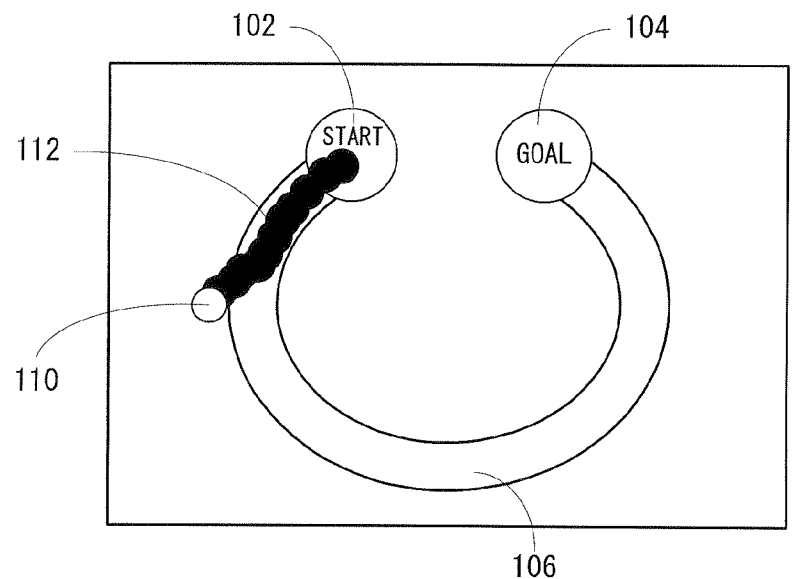
FIG. 5 is a view showing another non-limiting example game screen of a television.

In the virtual game, if and when the locus up to the goal is drawn within a limited time, the game is cleared: however, if the limited time exceeds before the locus is drawn up to the goal, or if the locus (a position corresponding to a current touch position) goes off (overreaches) the course (course object 106) as shown in FIG. 5, it is determined as a mistake. If being determined as a mistake, it is possible to resume the virtual game from the continuation (from the position that the limited time is exceeded or the locus goes off the course); however, the virtual game may be performed again from the first (a start position).

Figure 6:
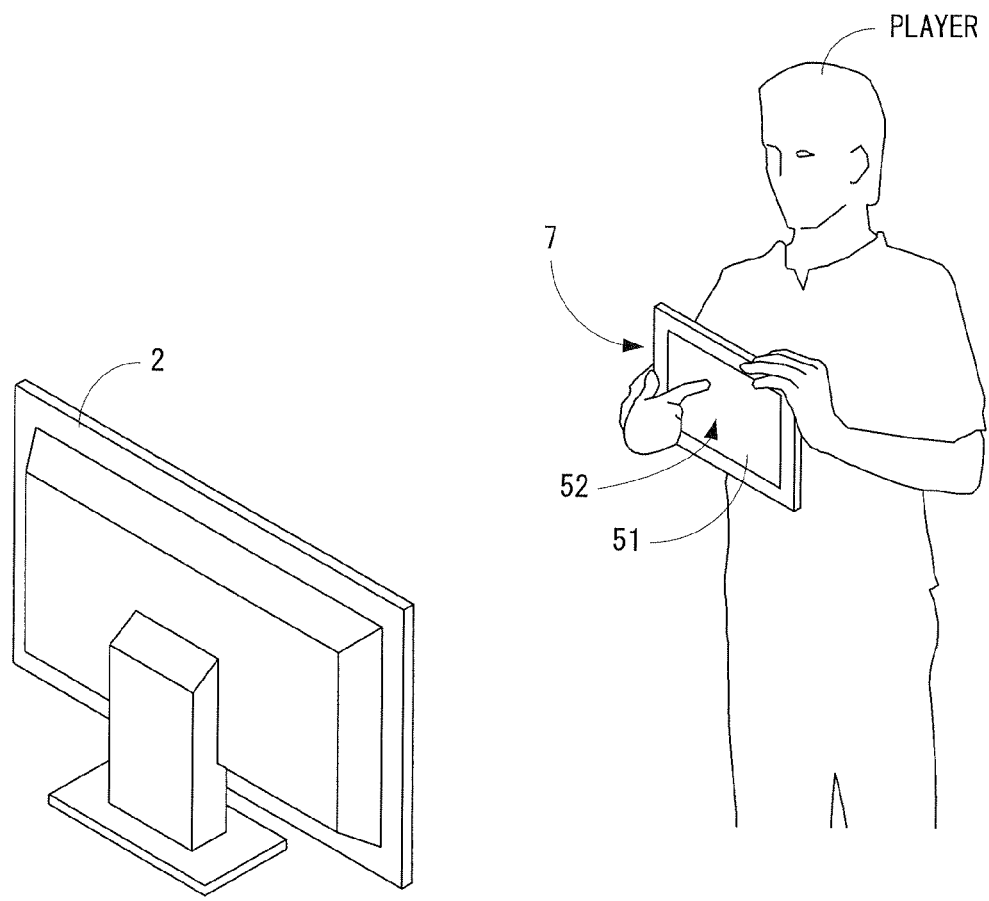
FIG. 6 is a view showing a non-limiting example situation that a virtual game is played with using the input terminal device.

Next, a method that the player performs an input operation with using the input terminal device 7 in a case where the player plays the virtual game according to this embodiment will be described. In this embodiment, as shown in FIG. 6, the player holds the input terminal device 7 in a manner that the inputting surface of the touch panel 52 provided on the input terminal device 7 is faced to a side of the television 2 (a side opposite to the player), and performs an input operation while seeing the game screen displayed on the television 2 but not seeing the inputting surface of the touch panel 52 (a screen of the LCD 51). That is, in this embodiment, as being different from a case where the player performs a normal operation that the touch panel 52, the analog stick 53 or the operating button 54 are operated while seeing the LCD 51, a state that the input terminal device 7 is held in the case where the normal input operation is to be performed is shifted to a state that the input terminal device 7 is held with its right and left reversed to perform the input operation.

In addition, in FIG. 6, for simplicity, the game apparatus 3 is not shown, and the analog stick 53, the operating button 54, etc. of the input terminal device 7 are omitted.

Thus, the player holds the input terminal device 7 in a manner that its right and left are reversed to turn the inputting surface of the touch panel 52 toward the television 2 to perform the input operation. Accordingly, the game screen 100 displayed on the screen of the television 2 and the inputting surface of the touch panel 52 are confronted with each other. Therefore, in this embodiment, an operation locus 112 according to the locus of the input operation is depicted on the game screen 100 as if the locus of the input operation performed on the inputting surface of the touch panel 52 is reflected in a mirror. This is for enabling an intuitive input operation. In addition, in this embodiment, the locus of the input operation is never displayed on the LCD 51 of the input terminal device 7.

More specifically, a positional relationship between a touch position on the inputting surface of the touch panel 52 and a position on the game screen 100 corresponding to the touch position is reversed right and left. Of course, a positional relationship between a touch position on the inputting surface of the touch panel 52 and objects (102, 104, 106) displayed on the game screen 100 is also reversed right and left.

In addition, since the game screen 100 and the inputting surface of the touch panel 52 are normally different from each other in size thereof, the locus of the input operation may not be seen as if the locus is reflected in a mirror; however, in fact, a television game image including the operation locus 112 which is depicted in a manner that the locus of the input operation is reflected in a mirror is produced.

In this embodiment, as shown in FIGS. 7(A) and 7(B), a coordinates system which is set to the inputting surface (detecting surface) of the touch panel 52 of the input terminal device 7 and a coordinates system which is set to the television game image produced in the VRAM 11 are the same. Furthermore, for simplicity, a size (the number of the dots in each of the vertical and horizontal directions) of the inputting surface of the touch panel 52 and a size (the number of the dots in each of the vertical and horizontal directions) of the television game image produced in the VRAM 11 are set as the same.

As shown in FIG. 7(A), an origin $O_1$ of a two-dimensional coordinates is set at a position equal to a center of the inputting surface of the touch panel 52, and an x axis is set in the horizontal direction of the inputting surface, and a y axis is set in the vertical direction. Furthermore, a rightward direction is an incremental direction of the x axis, and an upward direction is an incremental direction of the y axis.

Figure 8:
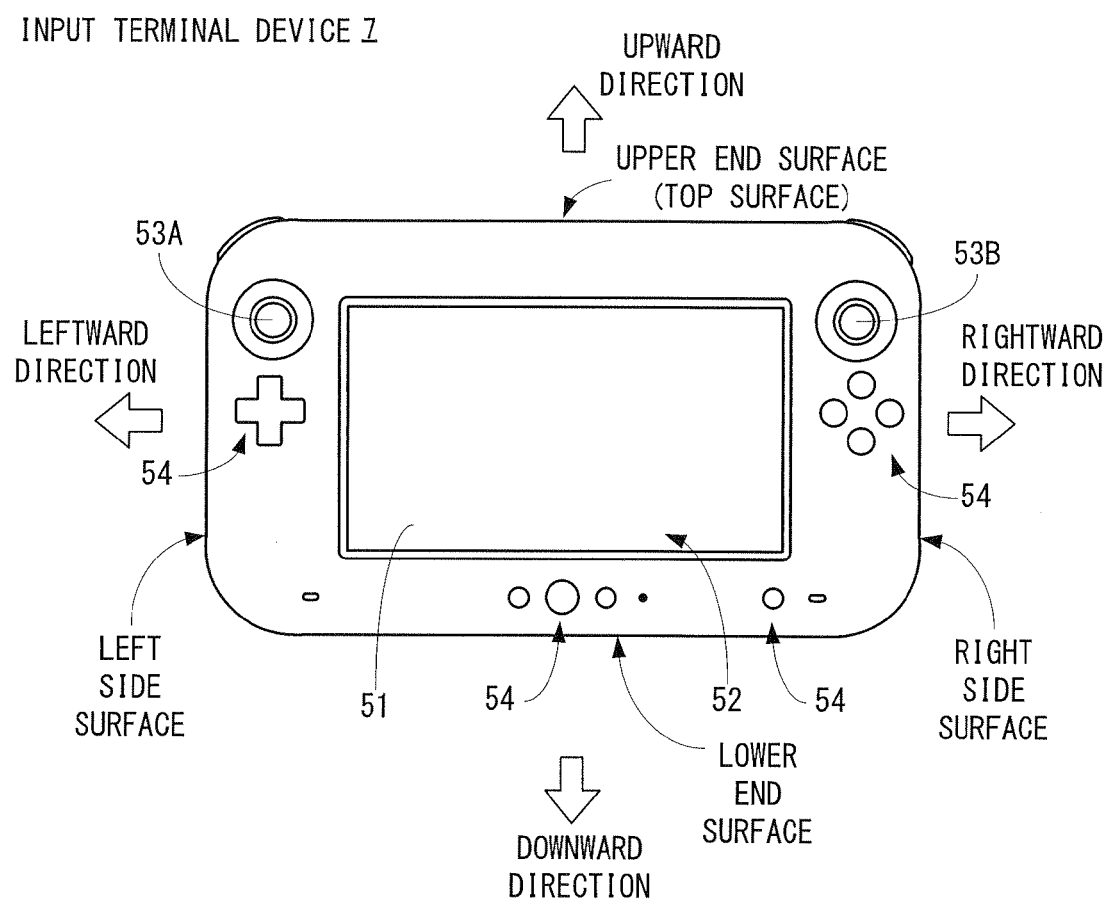
FIG. 8 is an appearance view showing a non-limiting example input terminal device.

Here, as shown in FIG. 8, in the input terminal device 7, the LCD 51, the touch panel 52, the analog stick 53 and the operating button 54 are provided on a front surface. The LCD 51 is provided at an approximately center of the input terminal device 7, and the touch panel 52 is provided on the LCD 51.

Furthermore, the analog stick 53 is provided on the front surface of the input terminal device 7 at a side near an upper end surface (top surface) thereof. Furthermore, the analog stick 53A is provided at a side near a left side surface of the input terminal device 7, and the analog stick 53B is provided at a side near a right side surface thereof. In addition, a surface opposite to the upper end surface of the input terminal device 7 is a lower end surface thereof.

In this embodiment, it is defined that a state that the player sees the front surface of the input terminal device 7, i.e. a state that a normal input operation is to be performed is a reference direction or attitude. Then, in the reference direction or attitude as shown in FIG. 8, a leftward direction, a rightward direction, an upward direction and a downward direction for player's eyes are fixedly assigned to the input terminal device 7. Similarly, directions of the touch panel 52 provided on the input terminal device 7 are fixedly assigned.

Therefore, in the two-dimensional coordinates system shown in FIG. 7(A), the incremental direction of the y axis corresponds to the upward direction of the touch panel 52, a decremental direction of the y axis corresponds to the downward direction of the touch panel 52, the incremental direction of the x axis corresponds to the rightward direction of the touch panel 52 and a decremental direction of the x axis corresponds to the leftward direction of the touch panel 52.

Furthermore, as shown in FIG. 7(B), an origin $O_2$ of the two-dimensional coordinates is set at a position equal to a center of the television game image, and an x axis is set in the horizontal direction of the television game image, and a y axis is set in the vertical direction thereof. Furthermore, a rightward direction of the television game image is an incremental direction of the x axis, and an upward direction thereof is an incremental direction of the y axis. The incremental direction of the y axis corresponds to the upward direction of the screen of the television 2, and a decremental direction of the y axis corresponds to the downward direction of the screen of the television 2, the incremental direction of the x axis corresponds to the rightward direction of the screen of the television 2, and a decremental direction of the x axis corresponds to the leftward direction of the screen of the television 2 (see FIG. 4(A)).

As described above, in this embodiment, the operation locus 112 according to the input operation is depicted in the game screen 100 as if the locus of the input operation performed on the inputting surface of the touch panel 52 is reflected in a mirror. At this time, coordinates of the touch position detected on the touch panel 52 is converted into a position rendered in line symmetry with respect to a straight line overlapping with the y axis. More specifically, as shown in FIG. 7(A), when the coordinates $(-x_1, y_1)$ of the touch position P is input (sent) to the game apparatus 3, a coordinate transformation is performed in the game apparatus 3, and as shown in FIG. 7(B), a point having a predetermined size is depicted at a position Q $(x_1, y_1)$ corresponding to the touch position P. In this embodiment, a sign (+, −) of the x coordinate (component) is made reversed.

Therefore, if the input operation (slide operation) is performed according to an arrow mark as shown in FIG. 9(A), for example, the television game image that the operation locus 112 in which a positional relationship of the locus of the slide operation is reversed right and left is depicted is produced as shown in FIG. 9(B).

In addition, for easily understanding, in FIGS. 9(A) and 9(B), although the operation locus 112 is indicated by a line having the same thickness as that of the locus of the slide operation, a thickness of the line of the operation locus 112 (size of a point constituting the operation locus 112) can be arbitrarily set in the television game image. In addition, the operation locus 112 is produced by depicting in accordance with a time series points each having a predetermined size at positions that the touch position corresponding to the touch position data input (sent) from the input terminal device 7 are subjected to the coordinate transformation.

In addition, in this embodiment, since the input terminal device 7 is held in a state with its right and left reversed, being shifted from a state that the normal input operation is to be performed, the coordinate transformation is performed such that the sign of the x coordinate of the touch position is made reversed; however, not limited thereto. In a case where the input terminal device 7 is held in a state with its top and bottom reversed, being shifted from a state that the normal input operation is to be performed, the coordinate transformation may be performed in a manner that the sign of the y coordinate (component) is made reversed.

Furthermore, an acceleration sensor or a gyro sensor or both of them may be provided in the input terminal device 7, based on outputs of one or both of the sensors, it is detected whether the input terminal device 7 is reversed right and left or reversed top and bottom from a state that the normal input operation is to be performed, and according to a detected result, the coordinates of the touch position may be subjected to the coordinate transformation.

Furthermore, in this embodiment, since the input operation is performed while the touch panel 52 (LCD 51) of the input terminal device 7 is turned toward the television 2, it is not necessary to display the game image on the LCD 51. However, on the LCD 51 of the input terminal device 7, the game image that only the background image of the game screen 100 may be displayed to be reversed right and left, or the game image including a message that the LCD 51 (touch panel 52) is to be operated while the same is turned toward the television 2 may be displayed. That is, information related to the virtual game (game processing) is provided visibly. In such a case, such a game image (terminal game image) is produced by the game apparatus 3, and the corresponding image data is sent to the input terminal device 7.

Figure 10:
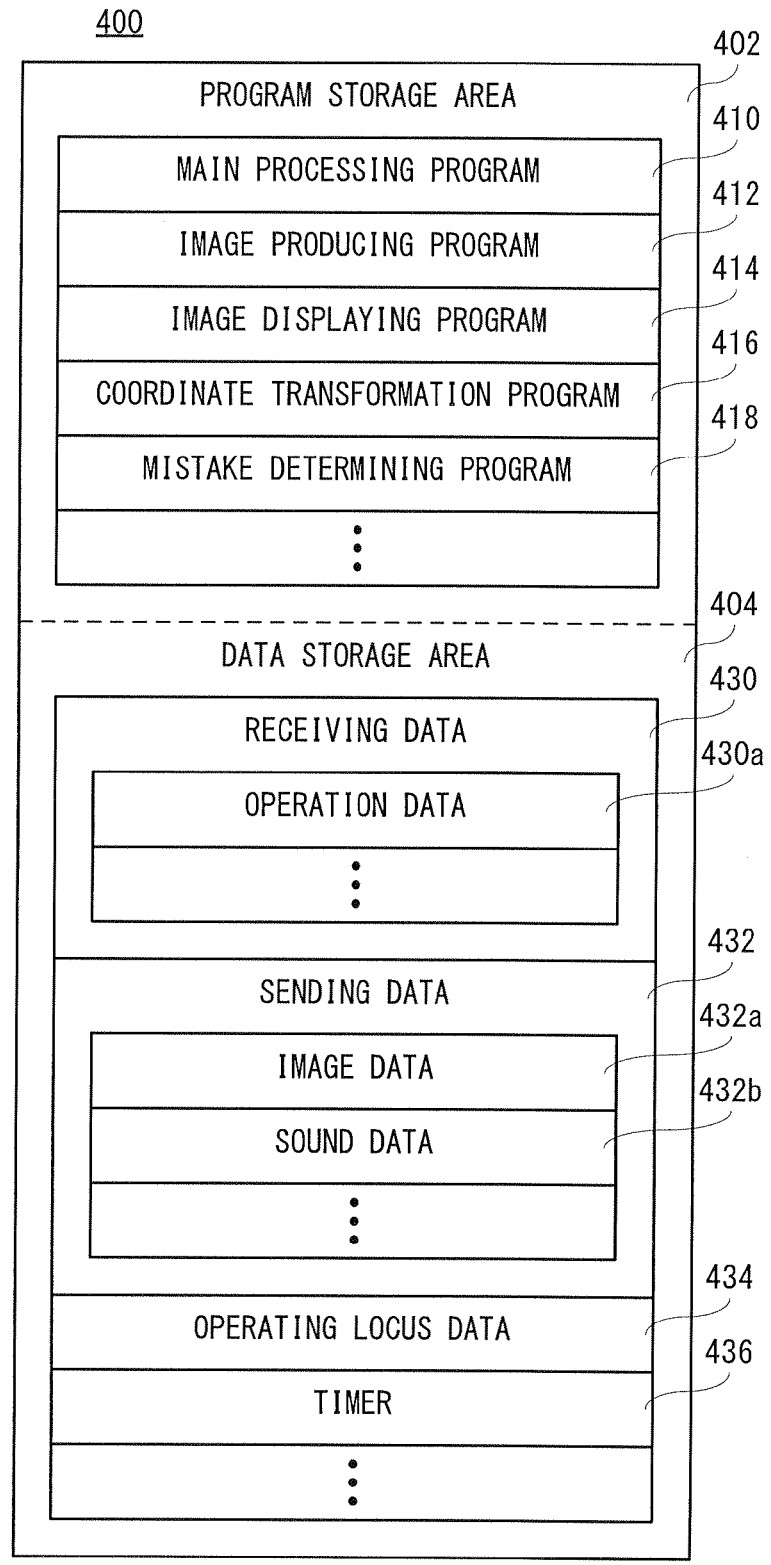
FIG. 10 is a view showing a non-limiting example memory map of a main memory shown in FIG. 2.

FIG. 10 shows an example of a memory map 400 of the main memory (11e, 12) of the game apparatus 3 shown in FIG. 2. As shown in FIG. 10, the main memory (11e, 12) includes a program storage area 402 and a data storage area 404. The program storage area 402 is stored with an information processing program such as a game program. The game program, for example, is partly or wholly read from the optical disk 4 at a suitable timing after the power of the game apparatus 3 is turned-on to be stored in the main memory.

In addition, the game program may be acquired from the flash memory 17 or an external device of the game apparatus 3 (via the Internet, for example) instead of the optical disk 4. Furthermore, some programs included in the game program may be stored in advance within the game apparatus 3.

In this embodiment, the game program is constituted by a main processing program 410, an image producing program 412, an image displaying program 414, a coordinate transformation program 416, a mistake determining program 418, etc.

The main processing program 410 is a program for performing processing of a main routine (entire game processing in FIG. 12) of the virtual game. The image producing program 412 is a program for producing the television game image and for producing the terminal game image by using data such as polygon data, texture data, etc.

The image displaying program 414 is a program for displaying on the television 2 image data of the television game image produced in accordance with the image producing program 412. Furthermore, the image displaying program 414 is also a program for sending the image data of the terminal game image produced according to the image producing program 412 to the input terminal device 7.

The coordinate transformation program 416 is a program for performing coordinate transformation on the coordinates of the touch position shown by the input operation by the player. As described above, in this embodiment, the sign of the x coordinate is made reversed. The coordinates data corresponding to the coordinates on which the coordinate transformation is performed are stored in accordance with a time series, and this is operation locus data 434 described later.

The mistake determining program 418 is a program for determining whether or not the operation locus 112 corresponding to the input operation (the position corresponding to the current touch position) overreaches the course object 106 or the limed time elapses before the operation locus 112 is depicted up to the goal object 104.

In addition, the program storage area 402 is further stored with a communication program, a sound producing program, a sound outputting program, a backup program, etc.

The data storage area 404 is stored with receiving data 430, sending data 432, operation locus data 434, etc.

The receiving data 430 is various kinds of data received from the input terminal device 7. The receiving data 430 includes operation data 430a. In a case where the input terminal device 7 is connected to the game apparatus 3 in a plural number, in correspondence to each of respective input terminal devices 7, the operation data 430a is also stored in a plural number.

The operation data 430a is data representing an operation by the player to the input terminal device 7, and as described above, includes operating button data, stick data and touch position data. However, the operation data 430a may be data representing an operation by the player who operates the input terminal device 7, and may include any one of the above-described data. The operation data 430a is sent from the input terminal device 7 and acquired in the game apparatus 3 to be stored in the main memory (11e, 12).

In addition, in the main memory (11e, 12), the predetermined number of operation data may be stored from the newest data (data acquired at the last) sequentially.

The sending data 432 includes image data 432a, sound data 432b, etc. The image data 432a is produced during the game processing, and includes image data of the terminal game image output by the input terminal device 7, image data of a menu image output by the input terminal device 7 by a menu function, and so on. The sound data 432b is produced through the game processing, and includes sound data of the terminal game sound output by the input terminal device 7 and sound data for BGM and sound effects.

The operation locus data 434 is data that the coordinates data corresponding to the coordinates that the coordinates of the touch positions shown by the player's input operation are subjected to the coordinate transformation are stored in accordance with a time series.

Furthermore, the data storage area 404 is provided with a timer 436 which is utilized for counting the limited time.

Although not shown, the data storage area 404 is stored with data utilized in the entire game processing (FIG. 12) described later, and provided with other flags and counters (timers). In addition, the data utilized in the entire game processing includes various kinds of data utilized in the game processing such as data representing various kinds of parameters set to various kinds of characters or objects appearing in the virtual game.

Figure 11:
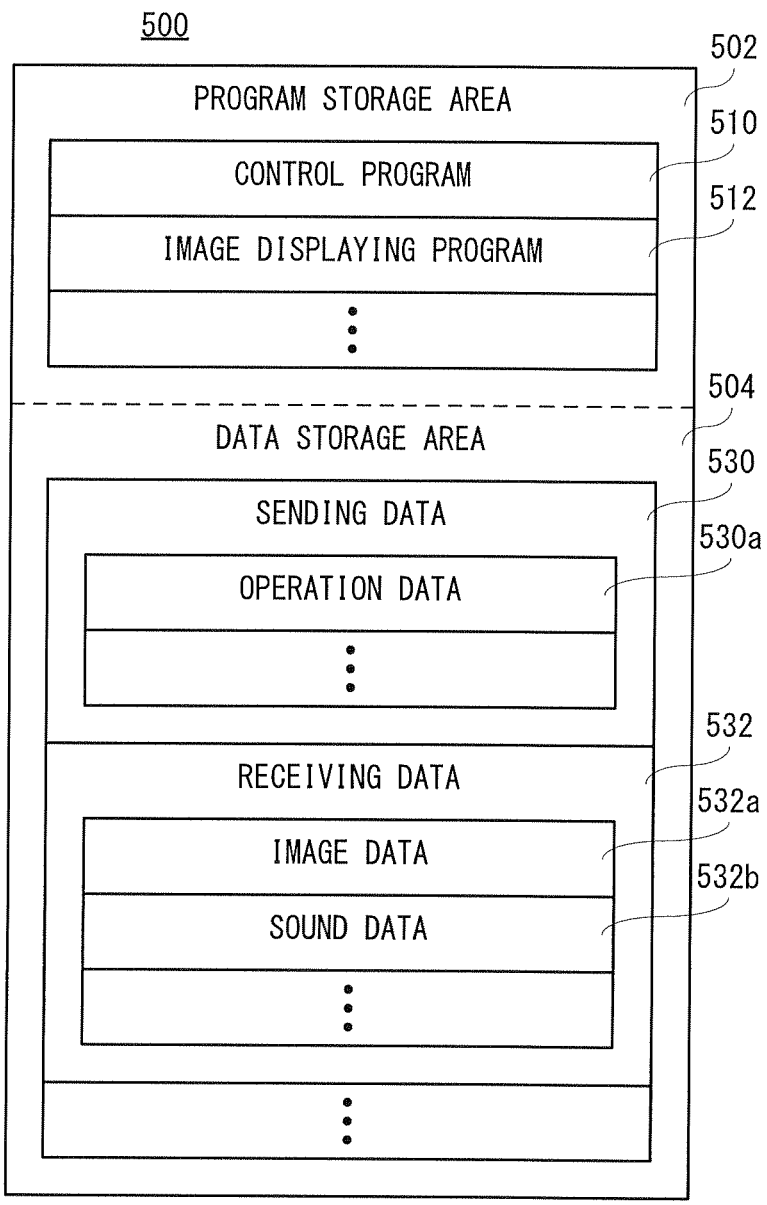
FIG. 11 is a view showing a non-limiting example memory map of an internal memory shown in FIG. 3.

FIG. 11 shows an example of a memory map 500 of the internal memory 98 of the input terminal device 7 shown in FIG. 3. As shown in FIG. 11, the internal memory 98 includes a program storage area 502 and a data storage area 504.

The program storage area 502 is stored with programs of a control program 510, an image displaying program 512, etc. The control program 510 is a program for performing entire processing of the input terminal device 7. The image displaying program 512 is a program for displaying (outputting) on the LCD 51 the image data 532a included in the receiving data 532 which is received from the game apparatus 3. In addition, the program storage area 502 is also stored with a sound outputting program, and so on.

The data storage area 504 is stored with the sending data 530 and the receiving data 532.

The sending data 530 includes the operation data 530a. Since the operation data 530a has the same content as that of the operation data 430a included in the above-described receiving data 430, a duplicate description is omitted here.

Similarly, the receiving data 532 includes image data 532a, sound data 532b, etc. Since these are the same as the image data 432a and the sound data 432b included in the above-described sending data 432, a duplicate description is omitted here.

Although not shown, the data storage area 504 is stored with other data necessary for performing the control program 510, and provided with other flags and counters (timers).

Figure 12:
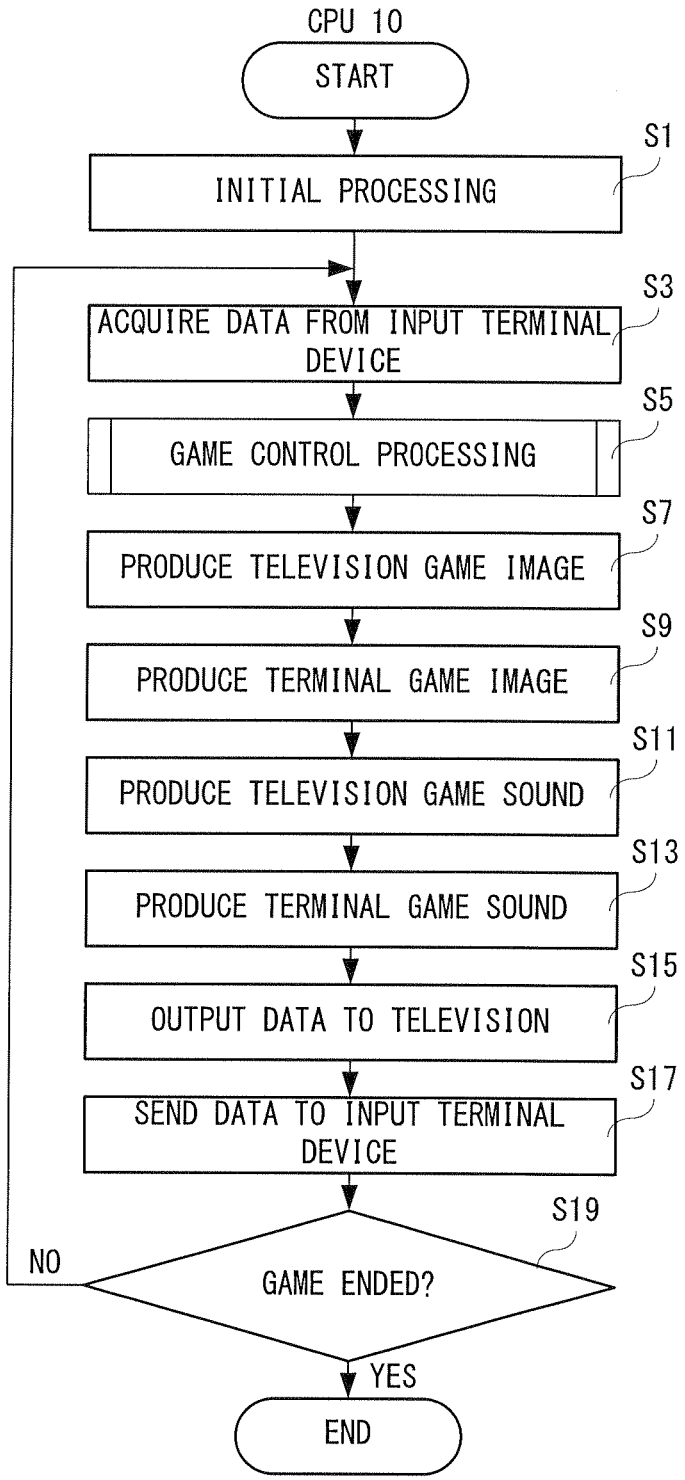
FIG. 12 is a flowchart showing a non-limiting example entire processing by a CPU of the game apparatus shown in FIG. 2.
Figure 13:
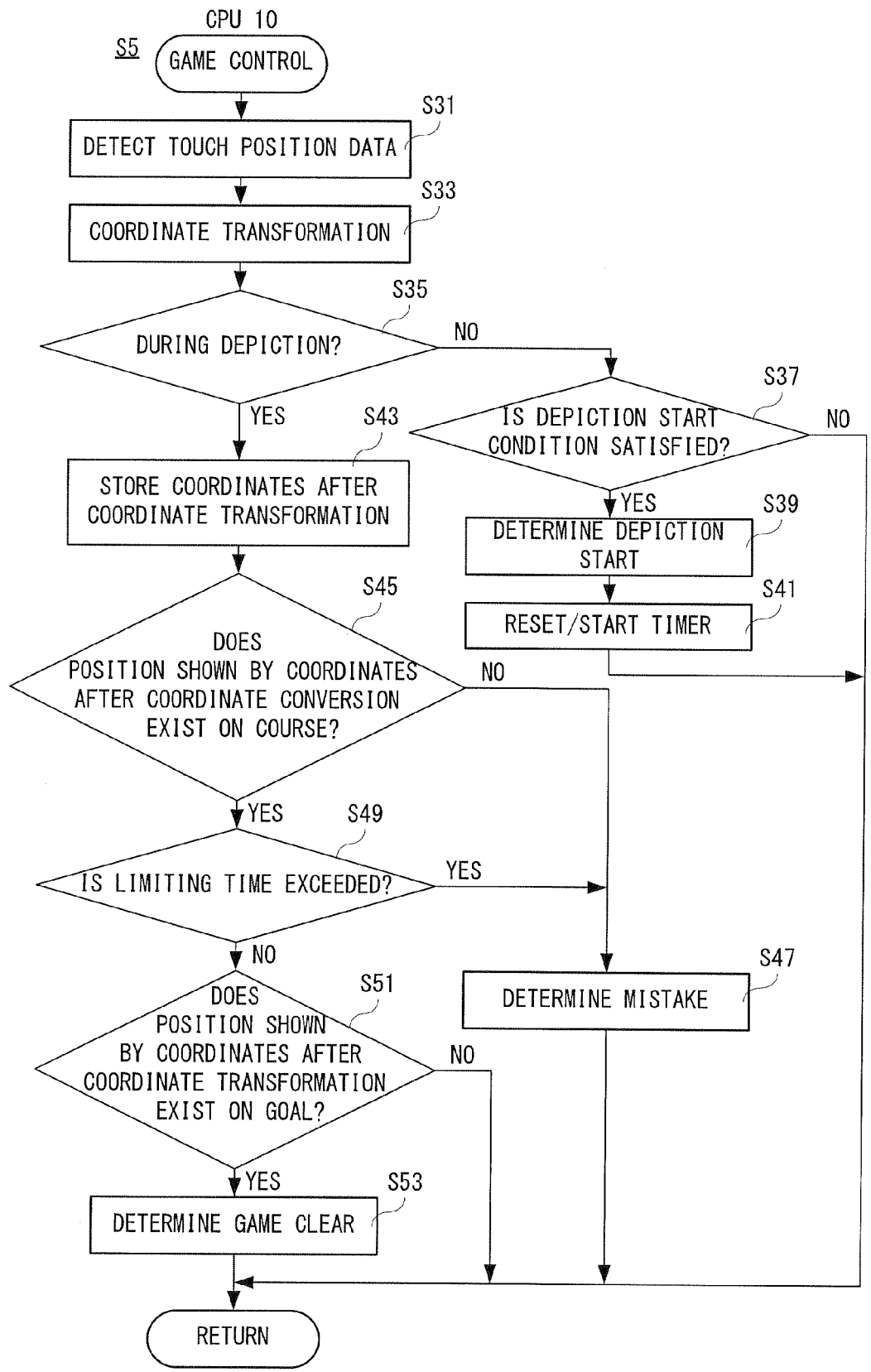
FIG. 13 is a flowchart showing a non-limiting example game control processing by the CPU of the game apparatus shown in FIG. 2.

FIG. 12 is a flowchart for the entire game processing by the CPU 10 provided in the game apparatus 3 shown in FIG. 2. In addition, the processing in respective steps of the flowchart shown in FIG. 12 are only examples, and therefore, as far as the same or similar results are obtained, a processing order of the respective steps may be exchanged. This is true for FIG. 13 described later. Furthermore, values of variables and threshold values utilized in the determining steps are also only examples, and if necessary, other values may be adopted. Furthermore, this embodiment is described on an assumption that the processing of the respective steps in flowcharts shown in FIG. 12 and FIG. 13 are performed by the CPU 10 basically; however, a part of the steps may be performed by a processor(s) and a dedicated circuit(s) other than the CPU 10.

If the power of the game apparatus 3 is turned-on, prior to execution of the entire game processing, the CPU 10 executes an activating program stored in a boot ROM not shown, whereby respective units such as the main memory (11e, 12), etc. can be initialized. Then, the game program 410 stored in the optical disk 4 is read in the main memory (11e, 12), thereby to start an execution of the game program 410 by the CPU 10.

When the entire game processing is started, the CPU 10 performs initial processing which is processing for building-up a virtual game space, arranging respective objects appearing in the game space at their initial positions, and setting initial values of various kinds of parameters used in the entire game processing.

Next, in a step S3, the CPU 10 acquires various kinds of data sent from the input terminal device 7, and in a step S5, the CPU 10 performs game control processing (see FIG. 13) described later.

In a next step S7, the CPU 10 and the GPU 11b perform producing processing of the television game image for being displayed on the television 2. Briefly described, the CPU 10 and the GPU 11b read data representative of a result of the game control processing in the step S5 from the main memory (11e, 12), and read data necessary for producing the game image from the VRAM 11d to thereby produce the television game image.

In a next step S9, the CPU 10 and the GPU 11b perform producing processing of the terminal game image for displaying on the input terminal device 7. Briefly described, as similar to the above-described television game image, the terminal game image is also produced by reading data representative of a result of the game control processing in the step S5 from the main memory (11e, 12), and reading data necessary for producing the game image from the VRAM 11d.

However, in a case where the game image is not displayed on the LCD 51 of the input terminal device 7, the processing of the step S9 is skipped.

Subsequently, in a step S11, the CPU 10 produces the television game sound for being output to the speaker 2a of the television 2. That is, the CPU 10 causes the DSP 11c to produce a game sound according to the result of the game control processing in the step S5.

The CPU 10 produces the terminal game sound to be output from the speaker 87 of the input terminal device 7 in a step S13. That is, the CPU 10 causes the DSP 11c to produce a game sound according to the result of the game control processing in the step S5.

However, if the television game sound and the terminal game sound are coincident with each other, the processing in the step S11 or S13 may not be performed.

Subsequently, in a step S15, the CPU 10 outputs the game image and the game sound to the television 2. Specifically, the CPU 10 sends to the AV-IC 15 the image data for the television game image stored in the VRAM 11d and the sound data for the television game sound produced by the DSP 11c in the step S11.

Next, in a step S17, the CPU 10 sends the game image and the game sound to the input terminal device 7. Specifically, the image data for the terminal game image stored in the VRAM 11d and the sound data for the terminal game sound produced by the DSP 11c in the step S13 are sent to the codec LSI 27 by the CPU 10 so as to be subjected to the predetermined compression processing by the codec LSI 27. Then, data of the image and the sound subjected to the compression processing is sent to the input terminal device 7 by the terminal communication module 28 via the antenna 29. The input terminal device 7 receives the data of the image and the sound sent from the game apparatus 3 by the wireless module 90, whereby the predetermined expansion processing is performed on the data of the image and the sound by the codec LSI 86. The image data being performed with the expansion processing is output to the LCD 51 and the sound data being performed with the expansion processing is output to the sound IC 88.

In addition, if the producing processing (S9) of the terminal game image is skipped, in the step S17, only the sound data is sent to the input terminal device 7.

Then, in a step S19, the CPU 10 determines whether or not the game is to be ended. Determination in the step S19 is performed by determining whether or not the game is made over or whether or not the player inputs an instruction to stop the game, for example. The determination on whether or not the game is made over is performed by determining the number of times that the mistake of the player character 104 (204) is permitted becomes zero (0), for example.

If "NO" is determined in the step S19, that is, if the game is not to be ended, the process returns to the step S3. On the other hand, if "YES" is determined in the step S19, that is, if the game is to be ended, the entire game processing is terminated.

FIG. 13 is a flowchart showing the game control processing in the step S5 shown in FIG. 12. As shown in FIG. 13, the CPU 10 detects touch position data in a step S31 upon start of the game control processing. That is, referring to the operation data 430a out of the receiving data 430, the touch position data is detected (acquired). In a step S33, the coordinates of the touch position corresponding to the touch position data detected in the step S31 is subjected to the coordinate transformation.

In a next step S35, it is determined whether or not the operation locus is being depicted. That is, the CPU 10 determines whether or not the operation locus 112 is being depicted based on the input operation. If "NO" is determined in the step S35, that is, if the operation locus is not being performed, in a step S37, it is determined whether or not a depiction start condition is satisfied. For example, the CPU 10 determines whether or not a time that a position on the game screen 100 according to the touch position designates the start object 102 exceeds a predetermined time period. In addition, whether or not the position on the game screen 100 corresponding to the touch position designates the start object 102 is determined based on whether or not the coordinates of the position on the game screen 100 is coincident with any one of a plurality of coordinates included in a displaying region of the start object 102. This is true for determining whether or not the position on the game screen 100 corresponding to the touch position exists on the goal object 104 or the course object 106.

If "NO" is determined in the step S37, that is, if the depiction start condition is not satisfied, the process returns to the entire game processing with no action. In addition, until the depiction start condition is satisfied, the operation locus 112 is not depicted, and in the game screen 100 as shown in FIG. 4(A), an indicator image 110 is displayed at a position corresponding to the touch position.

If "YES" is determined in the step S37, that is, if the depiction start condition is satisfied, in a step S39, a depiction start is determined, and in a step S41, the timer 436 is reset and started, and then, the process returns to the entire game processing. In addition, after the depiction start is determined in the step S39, the CPU 10 determines "YES" in the step S35 until the game is cleared or a mistake is determined.

In addition, if "YES" is determined in the step S35, that is, if the operation locus is being depicted, in a step S43, the coordinates subjected to the coordinate transformation in the step S33 is stored. That is, the coordinates data corresponding to the coordinates subjected to the coordinate transformation is additionally stored in accordance with a time series as the operation locus data 434. In addition, in the entire game processing (producing processing of the television game image) thereafter, the operation locus 112 is depicted according to the operation locus data 434.

In a subsequent step S45, it is determined whether or not the position indicated by the coordinates subjected to the coordinate transformation exists on the course. That is, the CPU 10 determines whether or not the position on the game screen 100 corresponding to the current touch position exists on the course object 106.

If "NO" is determined in the step S45, that is, if the position shown by the coordinates subjected to the coordinate transformation is out of the course, in a step S47, a mistake is determined, and then, the process returns to the entire game processing. Although not shown, at this time, the number of times that the mistake is permitted is decremented by one (1). Then, in the entire game processing thereafter, the television game image showing the mistake with dramatic effect is produced, and television game sound and the terminal game sound showing the mistake with dramatic effect are produced.

On the other hand, if "YES" is determined in the step S45, that is, if the position shown by the coordinates subjected to the coordinate transformation exists on the course, in a step S49, it is determined whether or not the time exceeds the limited time. Here, the CPU 10 determines whether or not the count value of the timer 436 reaches the limited time.

If "YES" is determined in the step S49, that is, if the limited time is exceeded, the process proceeds to the step S47. On the other hand, if "NO" is determined in the step S49, that is, if a time does not exceed the limited time, in a step S51, it is determined whether or not the position shown by the coordinates subjected to the coordinate transformation exists on the goal. Here, the CPU 10 determines whether or not the position on the game screen 100 corresponding to the current touch position exists on the goal object 104.

If "NO" is determined in the step S51, that is, if the position shown by the coordinates subjected to the coordinate transformation does not exist on the goal, the process returns to the entire game processing with no action. On the other hand, if "YES" is determined in the step S51, that is, the position shown by the coordinates subjected to the coordinate transformation exists on the goal, in a step S53, a game clear is determined, and then, the process returns to the entire game processing. Therefore, when the processing in the step S53 is performed, in the entire game processing thereafter, the television game image showing the game clear with dramatic effect is produced, and the television game sound and the terminal game sound showing the game clear with dramatic effect are produced.

According to this embodiment, since an input operation is performed in a state that an inputting surface of the touch panel provided separately from a display device for the game screen is turned toward the display device, an innovative input operation can be performed.

Furthermore, even if the player holds the input terminal device so as to perform the normal input operation, it is necessary to perform a slide operation such that the locus with its right and left reversed with respect to the course displayed on the game screen is depicted, in such a case, and therefore, it is possible to perform an innovative input operation even in such a case.

In addition, in this embodiment, both of the indicator image and the operation locus are displayed; however, if it is assumable that the position on the game screen corresponding to the current touch position can be indicated if only one of them is displayed.

Furthermore, in this embodiment, although the locus is depicted on the game screen by performing the slide operation on the inputting surface, but not limited thereto. In a shooting game, for example, a sight displayed on the game screen can be moved in accordance with the slide operation.

Furthermore, by simply performing the touch-on, it is possible to shoot (attack) a bullet (an object) toward a position corresponding to a touch position. However, a method for input operation is similar to that of a case shown in FIG. 6.

Furthermore, in this embodiment, although an input operation is performed from first to last during the play of the virtual game with a method shown in FIG. 6, such an input operation may be performed only in some scenes of the virtual game.

Furthermore, in this embodiment, although in order to depict the operation locus on the game screen as if the locus of the slide operation is reflected in a mirror, the coordinates of the touch position detected by the touch panel is subjected to the coordinate transformation as rendered inline symmetry with respect to a straight line overlapping with the x axis or the y axis, in a case where the operation locus is depicted on the game screen in a manner that the direction of the slide operation is reversed top and bottom, the coordinates of the touch position may be subjected to the coordinate transformation as rendered in point symmetry with respect to the origin.

Although in this embodiment, coordinates of the touch position is subjected to the coordinate transformation as rendered in line symmetry or point symmetry, not limited thereto. As far as a result becomes the same, an arbitrary method may be adopted as a method for the coordinate transformation. For example, instead of the coordinate transformation that becomes line symmetry with respect to a straight line overlapping with the y axis, the coordinate transformation rotated by 180 degrees around the y axis shown in FIG. 7(A) may be performed.

Furthermore, in a case where the coordinates are subjected to the coordinate transformation as rendered in point symmetry, the signs of both of the x coordinate and y coordinate may be reversed. In such a case, for example, the coordinate transformation rotating by 180 degrees around an axis passing the origin $O_1$ shown in FIG. 7(A) and perpendicular to both of the x axis and the y axis may be performed.

However, in any above-described case, if the coordinate system setting is changed, a method for coordinate transformation is to be changed in response thereto.

In addition, the game system shown in this embodiment is an example, as far as the structure that the display portion of the game screen and the input portion performing an input operation are separated from each other (not brought into contact with each other), and the input operation can be performed while an inputting surface of the input portion is turned toward the display portion (displaying surface), other structure may be adopted. As an example, instead of the game apparatus, a general-purpose personal computer (PC) is provided, and instead of the input terminal device, a tablet computer or smartphone is provided, and the PC and the tablet computer or smartphone are connected with each other in a communication-capable manner, and by using the tablet computer or smartphone as an input device for the PC, the same or similar game system can be implemented. However, it is not necessary to use the tablet computer or smartphone, structure that a touch panel or a touch pad separated from the display portion is connected to the PC in a communication-capable manner may be adopted.

Furthermore, in this embodiment, only a case that a single touch is performed is described, but, a multi-touch may be performed. In such a case, two or more courses are formed in a single game screen, and the input operation can be performed such that the operation locus for the courses is depicted at a time.

Furthermore, in this embodiment, although the processing for the coordinate transformation of the touch position is performed in the game apparatus, the coordinate transformation may be performed in the input terminal device.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A touch input system, comprising
a touch panel configured to receive a touch input, the touch panel with a reference point set at an arbitrary position of the inputting surface to the touch panel, an x-axis and a y-axis along two directions orthogonal to each other;
a first display screen which is not brought into contact with the touch panel; and a computer configured to perform at least information processing based on a touch input onto the touch panel to produce an image which is displayed on the first display screen, wherein
the computer performs the information processing based on an input position by the touch input to produce an indicator image which is an image which becomes an indicator for the input position and has a positional relationship rendered in line symmetry or point symmetry with respect to the input position on the touch panel about the x- and/or y-axis, or about the reference point.

2. A touch input system according to claim 1, wherein
the computer produces the indicator image having a positional relationship that is reversed with respect to the input position in a horizontal direction.

3. A touch input system according to claim 1, wherein
the indicator image includes an image indicative of a position corresponding to the input position.

4. A touch input system according to claim 1, wherein
the indicator image includes an image indicative of a position corresponding to a position to be touched.

5. A touch input system according to claim 1, further comprising a second display screen that the touch panel is provided on its displaying surface.

6. A touch input system according to claim 5, wherein
the computer further produces an image which is displayed on the second display screen.

7. A touch input system according to claim 1, wherein
the computer performs game processing based on the touch input.

8. A touch input apparatus which displays an image on a display screen which is not brought into contact with a touch panel configured to receive a touch input; the touch panel with a reference point set at an arbitrary position of the inputting surface to the touch panel, an x-axis and a y-axis along two directions orthogonal to each other; comprising a computer configured to perform at least:
information processing based on an input position on the touch panel to produce an indicator image which is an image which becomes an indicator for the input position at a position having a positional relationship rendered in line symmetry or point symmetry with respect to the input position on the touch panel about the x- and/or y-axis, or about the reference point.

9. A non-transitory computer readable storage medium storing a touch input control program executable by a computer which displays an image on a display screen which is not brought into contact with a touch panel configured to receive a touch input; the touch panel with a reference point set at an arbitrary position of the inputting surface to the touch panel, an x-axis and a y-axis along two directions orthogonal to each other, wherein the input control program causes the computer to perform information processing based on an input position on the touch panel to produce an indicator image which is an image which becomes an indicator for the input position at a position having a positional relationship rendered in line symmetry or point symmetry with respect to the input position on the touch panel about the x- and/or y-axis, or about the reference point.

10. A touch input control method by a computer system provided with a touch panel configured to receive a touch input, the touch panel with a reference point set at an arbitrary position of the inputting surface to the touch panel, an x-axis and a y-axis along two directions orthogonal to each other; and a display screen which is not brought into contact with the couch panel, comprising:
(a) detecting an input position by the touch input onto the touch panel; and
(b) performing information processing based on an input position detected in (a) to produce an indicator image which is an image which becomes an indicator for the input position at a position having a positional relationship rendered in line symmetry or point symmetry with respect to the input position on the touch panel about the x- and/or y-axis, or about the reference point, and to display the image on the display screen.

* * * * *